United States Patent
Lee

(10) Patent No.: US 9,825,467 B2
(45) Date of Patent: Nov. 21, 2017

(54) BUILDING ENERGY CONTROL SYSTEM AND METHOD

(71) Applicant: LG CNS CO., LTD., Seoul (KR)

(72) Inventor: Daniel Lee, Seoul (KR)

(73) Assignee: LG CNS CO., LTD., Seoul (KR)

( * ) Notice: Subject to any disclaimer, the term of this patent is extended or adjusted under 35 U.S.C. 154(b) by 421 days.

(21) Appl. No.: 14/185,170

(22) Filed: Feb. 20, 2014

(65) Prior Publication Data

US 2014/0236373 A1    Aug. 21, 2014

(30) Foreign Application Priority Data

Feb. 20, 2013  (KR) .................. 10-2013-0018281

(51) Int. Cl.
*G05D 3/12* (2006.01)
*H02J 4/00* (2006.01)
*H02J 3/14* (2006.01)
*G06Q 50/06* (2012.01)

(52) U.S. Cl.
CPC .................... *H02J 4/00* (2013.01); *H02J 3/14* (2013.01); *G06Q 50/06* (2013.01); *Y02B 70/3225* (2013.01); *Y04S 10/54* (2013.01); *Y04S 20/222* (2013.01)

(58) Field of Classification Search
None
See application file for complete search history.

(56) References Cited

U.S. PATENT DOCUMENTS 6,636,151 B2 * 10/2003 Busick ................. B67D 3/0032
222/146.1
8,584,030 B2 * 11/2013 Laycock .............. F24F 11/0086
715/772
8,843,350 B2 * 9/2014 Jacobi ................. G06F 17/5004
703/1
9,171,093 B2 * 10/2015 Error .................... G06F 17/3089
2009/0070168 A1 * 3/2009 Thompson ............. G06Q 50/06
705/412
2012/0166007 A1 * 6/2012 Jeong ........................ H02J 3/14
700/295
2015/0331552 A1 * 11/2015 Young ................ G06F 17/30861
715/808

FOREIGN PATENT DOCUMENTS

| KR | 10-2006-0119682 | 11/2006 |
| KR | 10-0821825 | 4/2008 |
| KR | 10-0964449 | 6/2010 |
| KR | 10-2011-0056171 | 5/2011 |
| KR | 10-1068862 | 9/2011 |
| KR | 10-2011-0122414 | 11/2011 |

OTHER PUBLICATIONS

Korean Office Action issued in related Application No. 10-2013-0018281 dated Oct. 21, 2014.

* cited by examiner

Primary Examiner — Evral E Bodden

(74) Attorney, Agent, or Firm — Ked & Associates, LLP

(57) ABSTRACT

A building energy control system and method are provided. The building energy control system may include a user interface unit configured to display an energy control situation and an energy control guide that corresponds to the energy control situation to manage a building and a facility, and to receive an input according to the energy control guide and an energy control unit configured to control energy consumption in the building and the facility through control of the building and facility according to the input.

15 Claims, 7 Drawing Sheets

FIG. 3

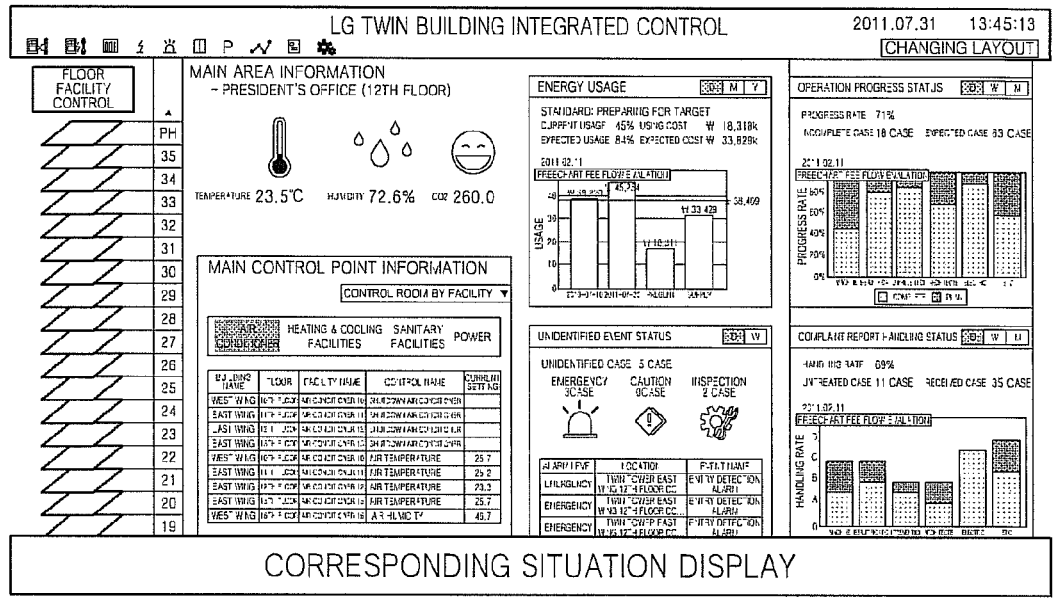

CORRESPONDING SITUATION DISPLAY

| | | | | |
|---|---|---|---|---|
| MACHINE FACILITY | HEAT SOURCE FACILITY | REFRIGERATOR | EXTERNAL LOAD | TEMPERATURE |
| | | COLD & HOT WATER DISPENSERS(COOLING) | | HUMIDITY |
| | | COLD & HOT WATER DISPENSERS(HEATING) | | SOLAR RADIATION |
| | | COOLING TOWER | INTERNAL LOAD | SCHEDULE |
| | | HOT WATER BOILER | | NUMBER OF PEOPLE |
| | | STEAM BOILER | | LIGHTENING |
| | AIR CONDITIONER | AHU | | DEVICE |
| | | FCU | | CO2 CONCENTRATION |
| | | FPU | | |
| | HEAT EXCHANGE FACILITY | HEAT EXCHANGER | | |
| | CONVEYOR SYSTEM | PUMP | | |
| | | FAN | | |
| | SANITARY FACILITY | PUMP | | |
| | | FAN | | |
| | EXTINGUISHMENT FACILITY | FIRE PUMP | | |
| ELECTRIC FACILITY | POWER SUBSTATION | TRANSFORMER | | |
| | POWER LOAD FACILITY | LIGHTENING EQUIPMENT | | |
| | | OUTLET EQUIPMENT | | |
| | TRANSPORT FACILITY | ELEVATOR | | |

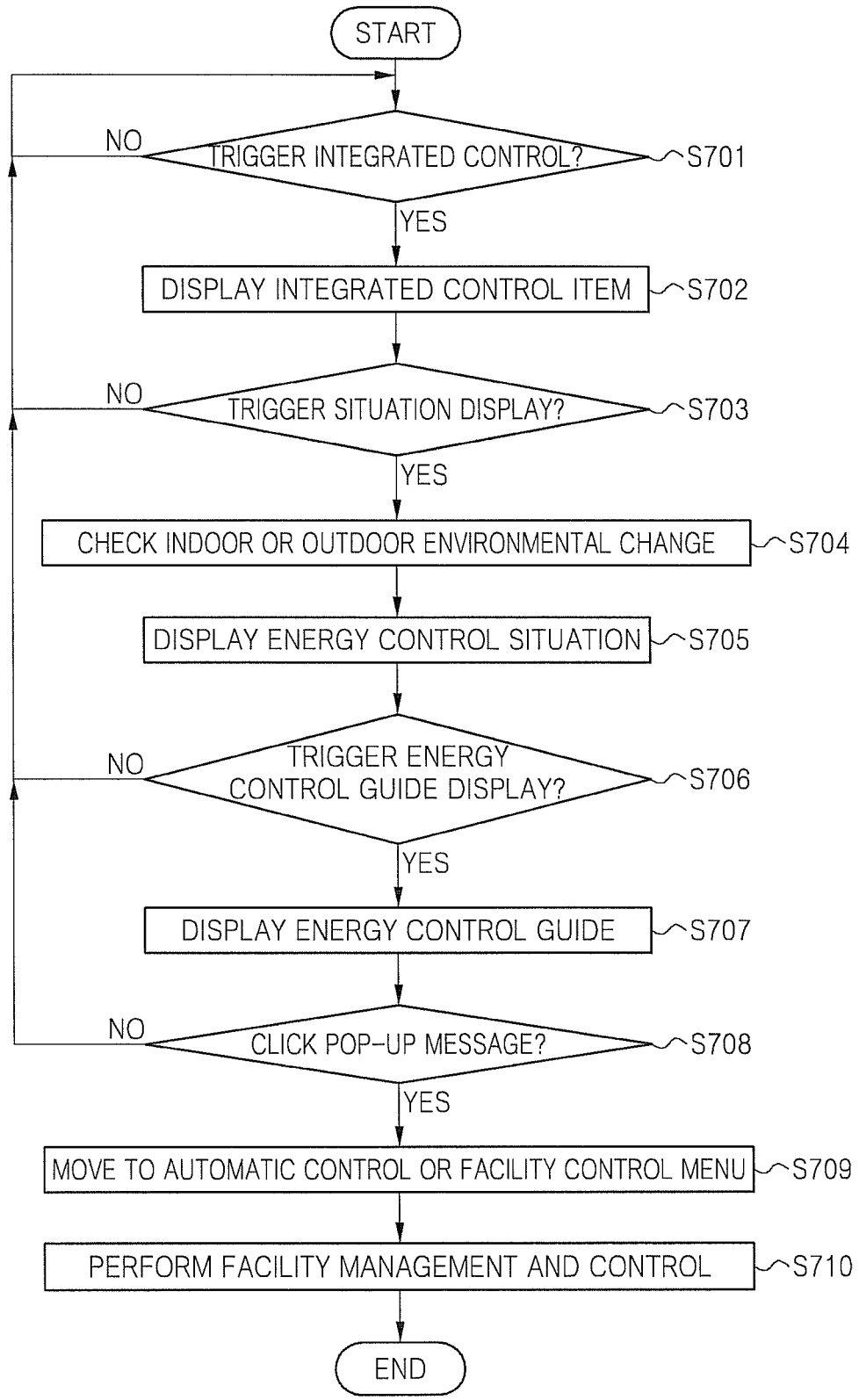

BUILDING ENERGY CONTROL SYSTEM AND METHOD

CROSS-REFERENCE TO RELATED APPLICATION(S)

This application claims priority under 35 U.S.C. §119 to Korean Patent Application No. 10-2013-0018281, filed on Feb. 20, 2013, whose entire disclosure is hereby incorporated by reference.

BACKGROUND

1. Field

The present disclosure relates to a building control system and method and more particularly to a building control system and method that use an automatic display of an energy control guide to perform a building energy control management and a facility inspection.

2. Background

Building control systems and methods are known. However, they suffer from various disadvantages.

BRIEF DESCRIPTION OF THE DRAWINGS

The embodiments will be described in detail with reference to the following drawings in which like reference numerals refer to like elements wherein:

FIG. 3 is a diagram illustrating a situation being displayed by a situation display unit in FIG. 1;

FIG. 7 is a flowchart illustrating a building control method according to an example embodiment of the present disclosure.

DETAILED DESCRIPTION

Figure 1:
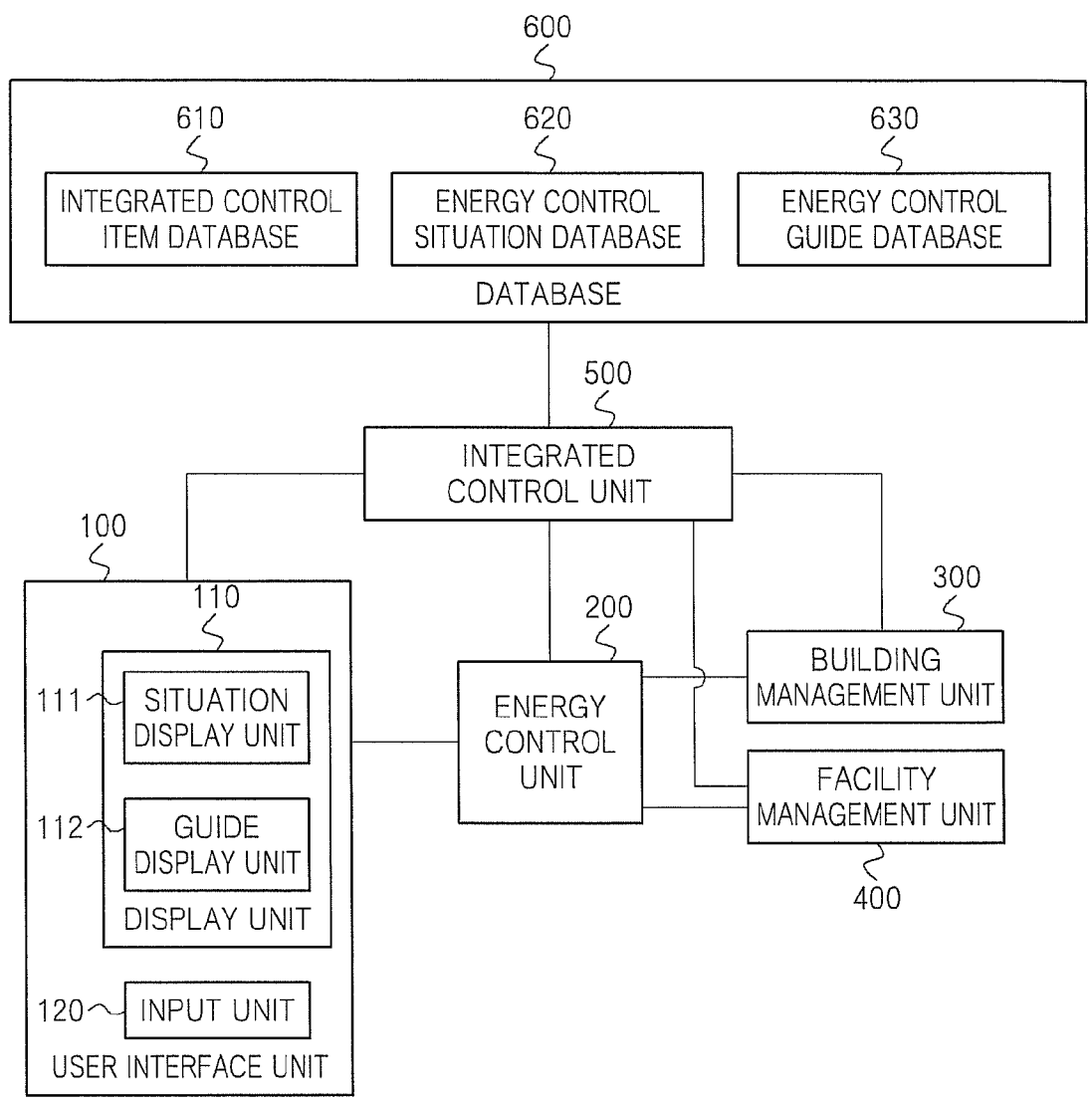
FIG. 1 is a block diagram illustrating a building energy control system according to the present disclosure.

Explanation of the present disclosure is merely an embodiment for structural or functional explanation, so the scope of the present disclosure should not be construed to be limited to the embodiments explained in the embodiment. That is, since the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "~ between", "immediately ~ between" or "adjacent to ~" and "directly adjacent to ~" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not described order of respective steps. The respective steps may be changed from a mentioned order unless specifically mentioned in context. Namely, respective steps may be performed in the same order as described, may be substantially simultaneously performed, or may be performed in reverse order.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms.

The present disclosure may be implemented as machine-readable codes on a machine-readable medium. The machine-readable medium includes any type of recording device for storing machine-readable data. Examples of the machine-readable recording medium include a read-only memory (ROM), a random access memory (RAM), a compact disk-read only memory (CD-ROM), a magnetic tape, a floppy disk, and optical data storage. The medium may also be carrier waves (e.g., Internet transmission). The computer-readable recording medium may be distributed among networked machine systems which store and execute machine-readable codes in a de-centralized manner.

In the foregoing exemplary system, the methods are described based on the flow chart as sequential steps or blocks, but the present disclosure is not limited to the order of the steps and some of them may be performed in order different from the order of the foregoing steps or simultaneously. Also, a skilled person in the art will understand that the steps are not exclusive but may include other steps, or one or more steps of the flow chart may be deleted without affecting the scope of the present disclosure.

The terms used in the present application are merely used to describe particular embodiments, and are not intended to limit the present disclosure. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present application.

A system for managing real time energy consumption through monitoring may be provided that monitors energy which is consumed in a building according to user control by synchronizing each sensor, thereby most effectively managing the energy. The energy management system may include a data processing server receiving data collected in a data collection device wherein the data processing server processes the received data as data requesting energy management, a web server providing the processed data to a user through a predetermined web browser type.

Therefore, such a system for managing a real time energy through monitoring collects data received from an energy measurement sensor to server and processes the data to provide the processed data to a user through a predetermined web browser form.

Moreover, a system for monitoring RF power in a global energy management system may be provided to stably supply and use electricity and improve reliability of a product by calculating control data and performing measurement through complete Fuzzy automation of analog measuring equipment. The system for monitoring RF power may include a digital power measuring controller being installed inside a power receiving and distributing board and may perform element measurement, on and off of a circuit breaker, temperature control of a panel and a transformer, peak and power factor control, meter pulse input, and interface communication.

An electric leakage alarm may perform leakage current measurement, plural contact output, multi-step alarm setting, alarm generation time, leakage current measuring, alarm reset by communication, and relay control output in case of generation of an event, and interface communication. An input and output relay unit may perform functions such as input state monitoring of a plurality of channels, setting by channels, and on and off control of an input relay unit and the plurality of channels to be interlocked with an output relay and the interface communication. A waveform capturer may perform present waveform measurement, fault waveform measurement, fault kind measurement, and interface communication. A sensor unit may sense signals corresponding to a fire index, a power condition index, an output attenuation index, a line quality index, and a comprehensive quality index. A main controller may store and manage all information for a system operation. A digital graphic system performs power management by realizing information visualization of scattered large information in digital graphic technique and driving and operating in a touch screen through the integration of display units of measuring equipment. A power quality analysis system (PC) stores, analyzes, and manages all information for stable driving by analyzing various information measured by the measuring equipment and power quality related information.

Therefore, such a power monitoring system of a global energy management system may perform an unattended remote management of all facilities through an integrated server of an internet data center on a control system of each site.

Moreover, a building energy management system and a controlling method thereof may be provided to set intensity of illumination according to business characteristics and personal tastes such as a design, a programming work, a drawing work, and a typing work by setting various modes of a conference room mode, a lobby mode, a business environment mode, a window illumination mode, a laboratory mode, and a rest room mode. The building energy management system may include a sensor unit, a database, a central control unit, a mode setting unit, and an illumination control unit. The sensor unit may sense environment states within building. The database may store data related to the environment states of the building. The central control unit may control devices related to the environment of the building on the basis of the stored data of the database. The mode setting unit may set an operation control command of a central control unit. The illumination control unit may control an illuminating unit according to the command of the central control unit on the basis of the setting states of the mode setting unit.

However, the aforementioned building energy management system just controls a lighting equipment and the central management system just controls a building energy management. Therefore, these systems may require another system in order to control a facility of a general building.

In regard to energy management, techniques used may include BMS (Building Management System) and FMS (Facility Management System) operation procedures which are initially set by a building designer to manage energy consumption of a building or facility. However, because the BMS and FMS operation procedures may not easily be modified without help of an expert, for example, a building operator may be forced to manage energy consumption of the building or facility without any modifications of BMS and FMS operation procedures.

In many actual situations, an internal and external environment of the building or facility may be changed due to a climate, a building user and a building use pattern so that the building operator may adapt the environment of the building or facility. Also, the building operator manually inspect the BMS and FMS operation procedures to adapt the environment of the building or facility. This is because the initially set procedures may become inaccurate with passage of time.

Accordingly, improved systems and techniques are desired for considering the internal and external environment of the building or facility or automatically or easily adapting the initially set procedures.

As broadly described and embodied herein, a main component of an IBS (Intelligent Building System) installed in a large building may include BMS (Building Management System), FMS (Facility Management System) and BEMS (Building Energy Management System) being complemented by an energy saving requirement and a facility may be directly controlled by a BAS (Building Automation System). Herein, the BAS may correspond to an automatic control system for a machine, power or lighting facility.

The BMS may correspond to a building management system and may manage data measured by the BAS, a detection system and interoperability of the BAS.

The FMS may correspond to a facility management system in a building and may perform a material, equipment, drawing or history management and may maintain uniformity of a facility management, manage a modification and inspection according to an operation time and product life and manage data for various equipment installed in a building.

The BEMS may correspond to a building energy management system and may analyze a building energy usage, analyze an energy usage trend and correlation, and perform a greenhouse gas and energy cost management.

The main component of the IBS may include a SI (System Integration) procedure to cause an SI administrator to install a CCMS (Central Control & Monitoring System) on a wall of a control room. Therefore, the CCMS may displays main control point information of a building to be managed by all of building operators.

Herein, the SI may collect a discrete service from the outside and may perform an integrated control through a system integration procedure which connects each system to collect respective system information and integrates the corresponding collected information.

For example, when a system integrated control is performed in a UbiSquare, i.e., a service platform providing a limited service, a service platform providing a specific service may be used without a system integration procedure.

For another example, when the system integrated control is performed in a SGP (Smart Green Platform, i.e., a platform with a service) which determines a solution providing scheme according to a delivery, the system integrated control may include a main service in a platform to construct a connectivity and to maximize reliability.

Herein, although the SGP distinguishes between an urban service and a building service, the SGP may share a database for a common application part of the urban service and building service, HMI and a common part of a building to provide a new plurality of services applying the common database. In this case, the database of the urban service may include a street facility management, a family safety, a traffic, a urban facility management, a water supply plant management, a contamination management, an intelligent water leakage management, a fire supervision, GIS, a digital signage, a common application and HMI. Moreover, the database of the building service may include an integrated building operation, the FMS, the BEMS, a common application, HMI and a common part of a building.

When the system integrated control is performed by the SGP, the system integrated control may provide an interactive service through using the integrated platform and the common database and may provide an additional service according to a client condition.

For example, when a facility inspection and component exchange is regularly performed in the FMS, a conventional refrigerator inspection is performed through a regular inspection and exchange according to an manufacturer's instruction. However, the BEMS may continuously monitor BMS data such as a refrigerator state including a cold water flux ($m^2/h$), cold water inlet temperature (° C.), outlet temperature (° C.) and power consumption (kWh) to calculate a coefficient of performance (COP) and may continuously monitor the BMS data such as power consumption of the refrigerator. The BEMS may continuously monitor a variance of a refrigerator efficiency to determine and register a regular or irregular inspection time as an event in the FMS.

For another example, when a control according to control setting values fixed in the BMS is performed, a conventional hot water boiler uses a previously set hot water temperature. However, the BEMS may use BMS data such as an outdoor temperature to set a detailed hot water temperature. When the outdoor temperature is high, a hot water temperature may be considered as a relatively warm water and when the outdoor temperature is low, a hot water temperature may be considered as a relatively cool water. The BEMS may continuously monitor the outdoor temperature to perform the BMS control considering the energy saving and comfortability of a building user.

A BEMS may be used as a management tool to illustrate an energy usage based trend when a menu item for energy usage and consumption analysis is triggered. The SGP may determine whether a situation considerable for the BMS control or the FMS control in view of an alarm related to energy usage occurs whether to actively apply the situation in the building management for saving the energy as the event.

In an automated IBS building, building management is automatically managed by the BMS. An automatic control for operating a facility may be performed in DDC (Direct Controller) and the BMS may perform monitoring of a current state, a method setting of manual and automatic operation, an ON/OFF control and a change of setting values.

On the other hand, in the automated building, the energy usage and a building comfort level may be varied according to ability and experience of the building manager (e.g., user). In this case, although the automatic control being performed on the DDC may be the same, the energy usage being used through a schedule control using an ON/OFF, an operating number control, an alternation of a coordination environment, a change of the hot water temperature and/or an adjustment of an outdoor air inflow rate adjustable to the BMS may be adjustable. Also, differential by ability and experience of the facility manager is generated during managing the building and facility to change the energy usage and building comfort.

Embodiments sorts a building management plan saving the energy by a corresponding situation, when the corresponding situation occurs, automatically displays the energy control guide on the building integrated control monitor and the building manager may refer to the energy control guide to properly modify and to perform a pre-inspection of the building facility.

That is, embodiments uses real time data of the BMS and energy using data of the BEMS for a building having the IBS, when the predefined situation generates, automatically displays the energy control guide corresponding to the generated situation through the CCMS of the wall to upwardly standardize the energy control differential by an ability and experience of the building manager and a maintenance effect. Also, the embodiments may automatically perform a modification and adaptation through BMS and FMS according to a varied situation to contribute to reduction of greenhouse gases.

The building energy control system may include at least one of the BMS, FMS or BEMS, or any combination thereof. Herein, the BMS and BEMS or the BEMS and FMS respectively may perform a push or direct communication.

FIG. 1 is a block diagram illustrating a building energy control system according to the present disclosure. The building energy control system may include a user interface unit 100 and an energy control unit 200.

The user interface unit 100 may display an energy control situation and a corresponding energy control guide during management of a building and facility and may receive a user input according to the displayed corresponding energy control guide.

The user interface unit 100 may include a display unit 110 and an input unit 120. Herein, the display unit 110 may correspond to a display device such as an LCD, and may display the energy control situation and the corresponding energy control guide to manage a building and facility. The input unit 120 may receive a user input according to the energy control guide.

A situation display unit 111 may display the energy control situation, and may detect a situation in which energy control is required during managing the building and facility in order to display the corresponding detected energy control situation on an integrated control monitor.

A guide display unit 112 may display the energy control guide and may display the energy control guide corresponding to the energy control situation detected by the situation display unit 111 on the integrated control monitor to provide an energy control plan applicable to a current management in order to actively perform an energy saving in a building management.

The building energy control system may further include database 600. The database 600 may include an energy control situation database 620 and an energy control guide database 630. Herein, the energy control situation database 620 may store an energy control situation of the building and facility, a circumstance and management condition applicable to the energy control situation, a mapping between the energy control situation and the circumstance and management condition and a mapping between the circumstance and management condition and data measured by BMS (Building Management System) or BAS (Building Automation System). The energy control guide database may store information for the energy control guide applicable to a specific situation of internal or external load.

The energy control unit 200 may control energies of the building and facility through control of the building and facility according to the user input. Herein, the energy control unit 200 may perform an energy control through an automatic energy control or automatic coupling to FMS (Facility Management System) item, and when the building manager checks the contents of the energy control guide displayed by the guide display unit 112, the energy control unit 200 may move to an automatic control menu or facility control menu through a link to display the energy control guide on an integrated control monitor, and thereby instantaneously perform a management and facility control according to a selection of the building manager.

Furthermore, the building energy control system may further include a building management unit 300 for managing the building and a facility management unit 400 for managing the facility. The energy control unit 200 may directly communicate each of the building management unit 300 and the facility management unit 400 to control the energy consumption of the building and facility. Also, the energy control unit 200 may indirectly communicate with each of the building management unit 300 and facility management unit 400 through an integrated control unit 500 to control the energy consumption of the building and facility.

The integrated control unit 500 may perform a central control of the building, apply a building manager's idea (e.g., item selection data related to the building management being inputted by the building manager through an input device like as a keypad or a touch panel) to properly determine contents related to the building management (e.g., data related to a facility in the building and an indoor environment, a generated event or an operation progress status) per a corresponding building (e.g., a building feature), and may display the contents related to the corresponding determined building management on the integrated control monitor through the display unit 110. The integrated control unit 500 may apply a global energy saving requirement to continuously check the energy usage of the building and to display the energy usage on the integrated control monitor through the display unit 110.

The integrated control unit 500 may control the energy control unit 200, the building management unit 300 and the facility management unit 400.

Herein, the building energy control system may further include an integrated control item database 610 that sorts the contents related to the building management (e.g., an integrated control item and corresponding building management data) by the item selection data related to the building management or by the building feature, and reads the contents related to the building management corresponding to the item selection data related to the building management or the building feature being received from the building manager to display the contents related to the building management on the integrated control monitor.

Figure 2:
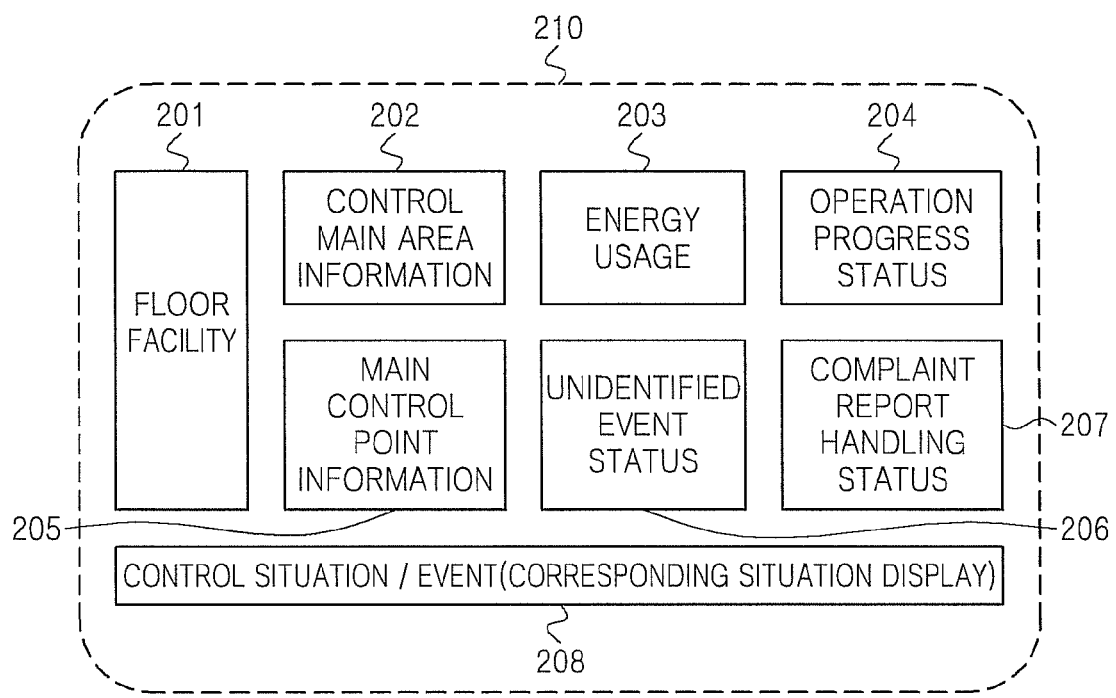
FIG. 2 is a layout diagram illustrating an integrated control monitor being displayed by an integrated control unit in FIG. 1.

FIG. 2 is a layout diagram illustrating an integrated control monitor being displayed by an integrated control unit of FIG. 1. A layout of the integrated control monitor 210 being outputted by the integrated control unit 500 may display an item being outputted on the integrated control monitor when the building manager triggers (selects) an integrated control through the input device. The item may include at least one of a floor facility 201, main area information 202, an energy usage 203, a work progress status 204, main control point information 205, an unidentified event status 206, a complaint report handling status 207, or a control situation/event 208. The item may apply the building manager's idea (e.g., item selection data related to the building management) to be properly determined per the building (e.g., the building feature).

FIG. 3 is a diagram illustrating a situation being displayed by a situation display unit in FIG. 1. The situation display unit 111 may display the energy control situation through the input device when the building manager triggers a corresponding situation display, use data being continuously measured by the BMS or BAS, detect a change of an internal or external environment corresponding to a call signal of the energy control guide database 630 stored in the guide display unit 112 and display the energy control situation corresponding to the detected change on the integrated control monitor.

For example, when the energy control system of a refrigerator uses an outdoor air to perform a cooling, energy for cooling may be saved. Therefore, the cooling using the outdoor air is determined to the energy control guide to be stored in the energy control guide database, and when the cooling using the outdoor air satisfies a previously set outdoor air condition, the cooling may be performed in a previously set range. Also, the range performing the cooling using the outdoor air may be continuously adjusted through a comparison of the outdoor condition with an indoor condition.

Therefore, when the outdoor air condition performing the outdoor air cooling is determined based on a temperature or an enthalpy and data of a temperature and humidity being measured by the BMS or BAS satisfies the corresponding set range, the situation display unit 111 displays the energy control situation (e.g., a current situation corresponds to a condition adaptable for the outdoor air cooling so that the energy control unit opens an outdoor air damper to perform the outdoor air cooling and the cooling energy is saved) corresponding to the detected data on the integrated control monitor.

When the energy control situation database 620 stores information for the energy control situation of the building, the circumstance and management condition applicable for the energy control situation, a mapping with the energy control situation and the circumstance and management condition and a mapping with the circumstance and management condition and the data measured by the BMS and BAS, the situation display unit 111 may display the energy control situation on a bottom of the integrated control monitor.

Thus, when the data being continuously measured by the BMS and BAS corresponds to the circumstance and management condition, the situation display unit 111 may automatically read information for the energy control situation mapped with the corresponding measured circumstance and management condition from the energy control situation database 620 to display the energy control situation.

Figure 4:
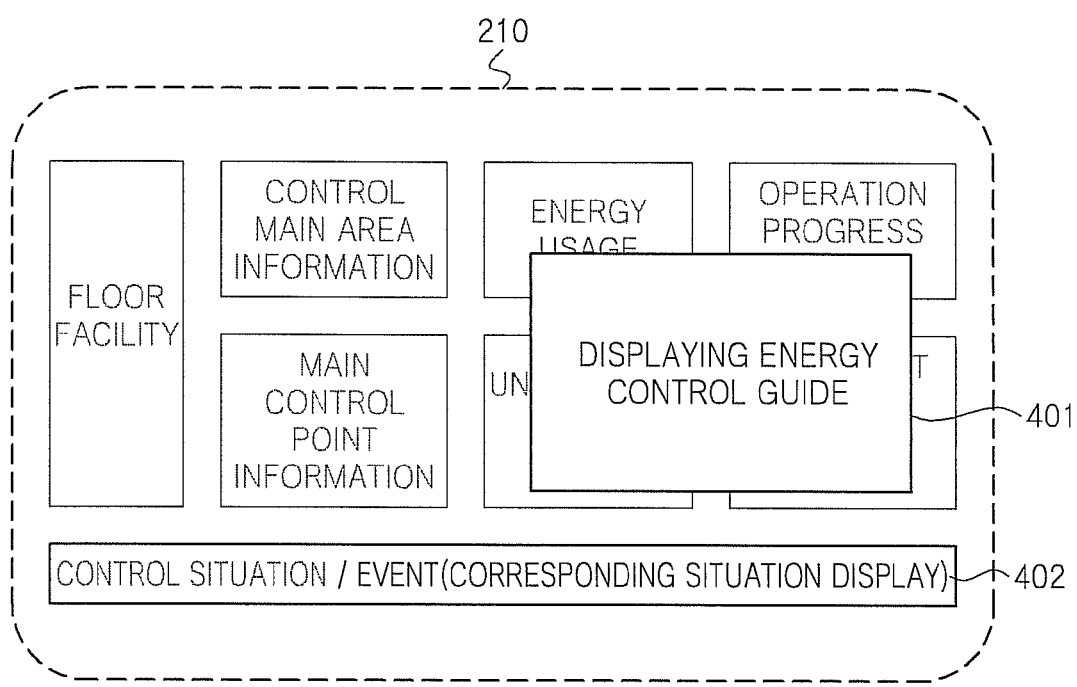
FIG. 4 is a layout diagram illustrating an integrated control monitor being displayed by a guide display unit in FIG. 1.

FIG. 4 is a layout diagram illustrating an integrated control monitor being displayed by a guide display unit of FIG. 1. A layout of the integrated control monitor 210 being outputted by the guide display unit 112 may include an item that is displayed on the integrated control monitor when the building manager triggers displaying of the energy control guide through the input device. The item may include a display of the energy control guide 401 and the event 402 (displaying the corresponding situation).

When the building manager triggers the event (displaying the corresponding situation), the guide display unit 112 may provide the item selection information for displaying the corresponding situation to the situation display unit 111 and the situation display unit 111 may display the energy control situation on the integrated control monitor.

The energy control guide database 630 is similarly implemented with the energy control situation database 620. Therefore, the guide display unit 112 may use the data being continuously measured by the BMS or BAS, detects the change of an internal or external environment corresponding to the call signal of the energy control guide database 630 and display the energy control guide corresponding to the detected change on the integrated control monitor.

Figure 5:
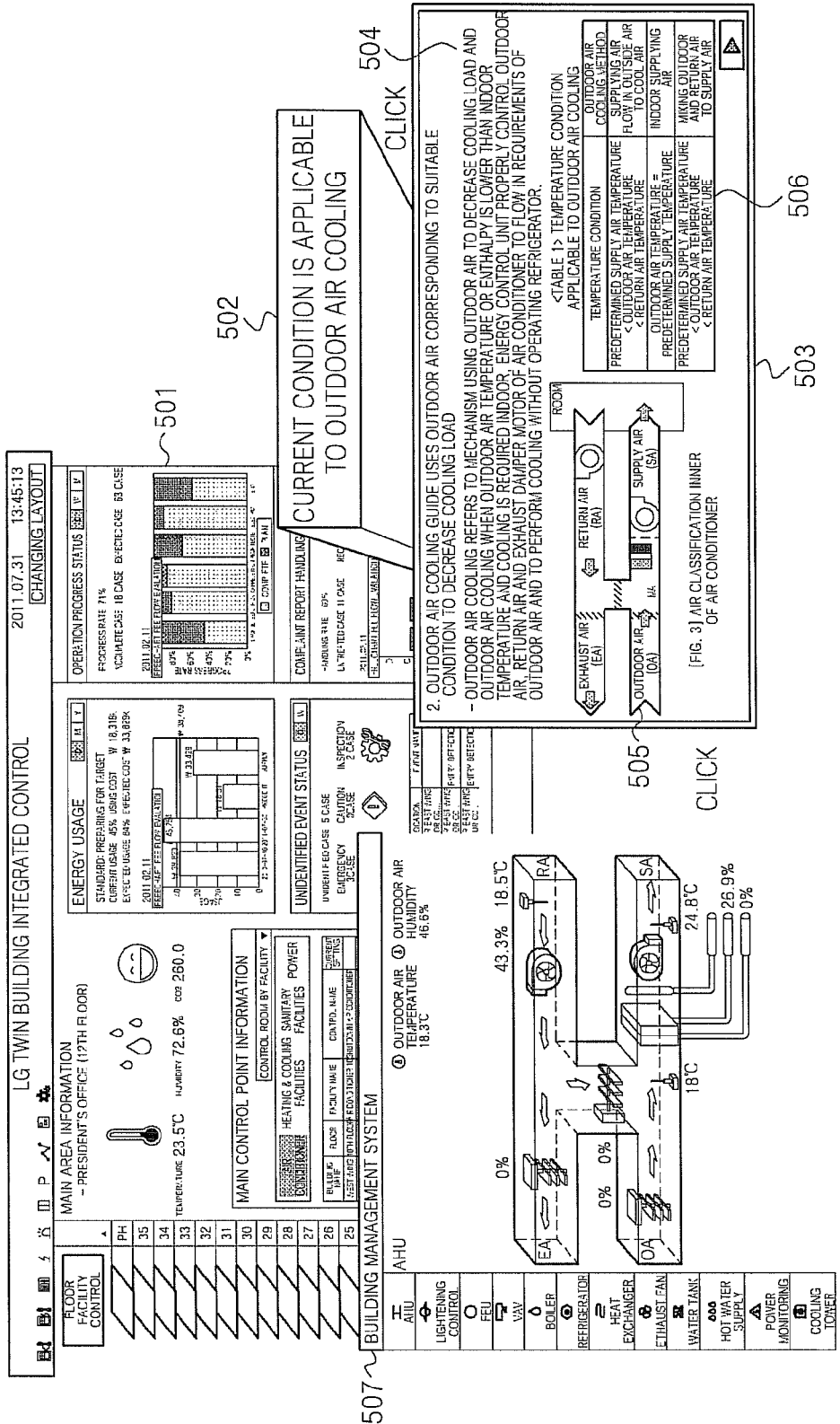
FIG. 5 is a diagram illustrating an energy control guide being displayed by a guide display unit and an automatic control or FMS (Facility Management System) item being displayed by an energy control unit in FIG. 1.

FIG. 5 is a diagram illustrating an energy control guide being displayed by a guide display unit and an automatic control or FMS (Facility Management System) item being displayed by an energy control unit of FIG. 1. The guide display unit 112 may display a summary 502 (e.g., the current condition is applicable for the outdoor air cooling) of the energy control guide on the bottom of the integrated control monitor 501 and display a detail of the energy control guide as a pop-up message 503 when the building manager triggers the summary 502.

For example, when the energy control guide corresponds to an outdoor air cooling guide, the display unit 112 may display detailed text 504 of the outdoor air cooling guide such as 'the outdoor air cooling refers to a mechanism using the outdoor air to decrease a cooling load and outdoor air cooling when outdoor air temperature or enthalpy is lower than indoor temperature and cooling is required indoor, energy control unit properly control outdoor air, return air and exhaust damper motor of air conditioner to flow in requirements of outdoor air and to perform cooling without operating refrigerator,' an image 505 for air classification of an air conditioner and a table 506 for a temperature condition applicable for the outdoor air cooling in the pop-up message 503.

The building manager may search the energy control guide menu of the BEMS to check required content of the energy control guide as a pop-up message through the guide display unit 112 and the guide display unit may sort the energy control guide by the facility.

In order that the guide display unit 112 displays the energy control guide corresponding to the detected energy control situation on the bottom of the integrated control monitor, the energy control guide database 630 storing the energy control guide corresponding to the energy control situation of the building may be previously stored so that the building manager may check and perform the energy control. Herein, when an item of the energy control guide is triggered, the display unit 112 may display the energy control guide corresponding to the energy control situation as the pop-up message through the mapping with the energy control guide and the energy control situation, and may search the required energy control guide through searching and sorting in the energy control guide menu of the BEMS.

Figure 6:
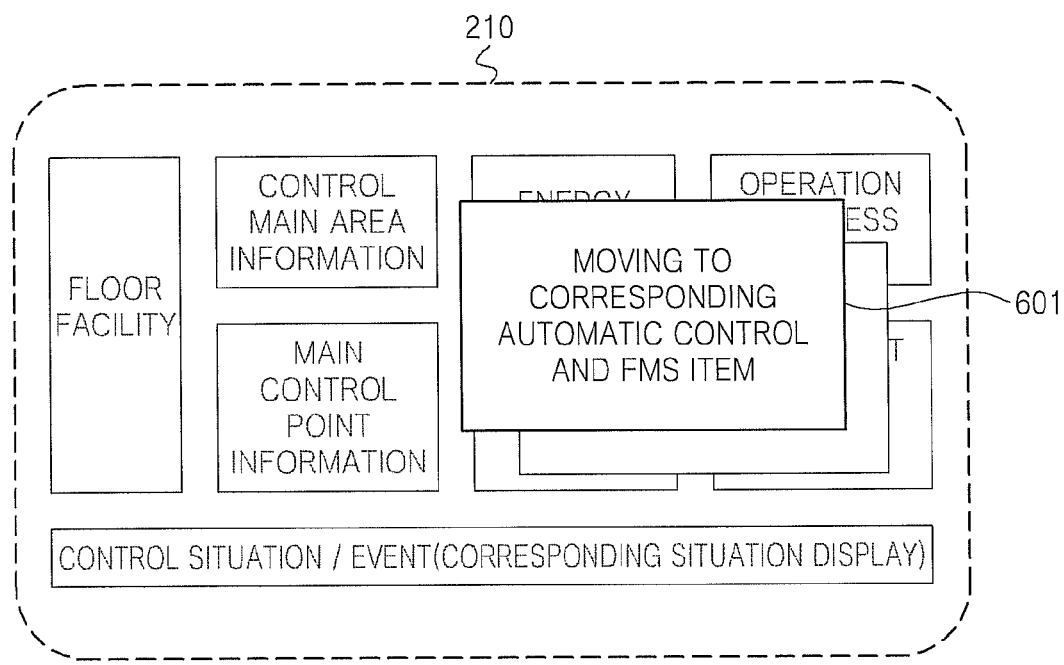
FIG. 6 is a layout diagram illustrating an integrated control monitor being displayed by an energy control unit in FIG. 1.

FIG. 6 is a layout diagram illustrating an integrated control monitor being displayed by an energy control unit in FIG. 1. A layout of the integrated control monitor being outputted by the energy control unit 200 may include a display of an item being outputted on the integrated control monitor when the building manager triggers moving to the corresponding automatic control or FMS menu through the input device, and the item includes a moving to the corresponding automatic control or FMS menu 601.

When the building manager triggers a pop-up message (i.e., a detail of the energy control guide) displayed on the guide display unit 112, a menu 601 may be displayed for move to the automatic control of the facility or FMS, and the energy control unit 200 may perform energy control and event processing.

In order that the energy control unit 200 displays the automatic control and FMS item corresponding to the displayed energy control guide, the energy control unit 200 may previously store the energy control situation and the corresponding automatic control or FMS menu and a mapping with the energy control guide and the corresponding automatic control or FMS item.

FIG. 7 is a flowchart illustrating a building control method according to an example embodiment of the present disclosure. The building energy control system may display the energy control situation on the display unit 110 during management of the building and facility, display the corresponding energy control guide on the display unit 110, receive the user input according to the energy control guide and perform the energy control of the building and facility according to the user input.

The display unit 110 may correspond to a display device such as an LCD display or the like, and may display an image of an integrated control, displaying the corresponding situation, displaying the energy control guide and moving to the automatic control or FMS item.

When the building manager triggers (or selects) the image of the integrated control items through the input device, such as the keypad and touch panel, the integrated control unit 500 detects a selection of the image for integrated control in Step S701, and uses the data being continuously measured by the BMS corresponding to the building control system or the BAS corresponding to the automatic control system of the facility to display the information corresponding to the determined integrated control item. For example, information may be displayed corresponding to the floor facility, main area information, the energy usage, the work progress status, main control point information, the unidentified event status, the complaint report handling status, a control situation/event, and the like, through the display unit 110 on the integrated control monitor, in Step S702.

The BMS may control the interoperability of the BAS to control data measured by the BAS and a detection system and the BAS may directly control the facilities such as the machine, power and lightening facility and the data being continuously measured by the BMS or BAS transfer to the building energy control system through the SGP.

When the building manager inputs the building manager's idea related to the building management through the input unit 120 as the item selection data, the integrated control unit 500 may apply the corresponding inputted item selection data to determine the contents related to the building management such as the data related to the corresponding facility and internal environment, generated event and work progress status from the integrated control item database 610, and may map the integrated control item corresponding to the building feature with the corresponding building management data to display the mapped integrated control item through the display unit 110 on the integrated control monitor.

The integrated control unit 500 may apply the recent global energy saving requirement to continuously check the energy usage of the building and to display the energy usage being included in the integrated control item through the display unit 110 on the integrated control monitor.

When the building manager triggers display of the corresponding situation through the input device, the situation display unit 111 may detect the selection, in Step S703, and may determine whether the situation for performing the predetermined energy control occurs in managing the building and facility to display the determined energy control situation through the display unit 110 on the integrated control monitor.

That is, the situation display unit 111 may use the data being continuously measured by the BMS or BAS, check the change internal or external environment corresponding to the call signal of the energy control guide database 630 in the guide display unit 112, in Step S704, and may determine the information for the energy control situation related to the checked change from the energy control situation database 620 to display the information through the display unit 110 on the integrated control monitor, in Step S705.

When the building manager triggers displaying the energy control guide through the input device, the guide display unit 112 may detect the selection, in Step S706, read the information of the energy control guide corresponding to the energy control situation of Step S704 to display the information through the display unit 110 on the integrated control monitor to provide an energy control plan applicable for a current management to the building manager, in Step S707.

The guide display unit 112 may display the energy control guide on the bottom of the integrated control monitor as a summary to be easily adapted to the building manager, and when the building manager triggers the summary, may detect the selection to display detailed information of the energy control guide as a pop-up message.

When the building manger searches a required content, the guide display unit 112 may display the energy control guide menu of the BEMS on the integrated control monitor, and when the building manger searches a required content of the corresponding energy control guide, the guide display unit 112 may sort the energy control guide by the facility to display the energy control guide on the integrated control monitor.

When the building manager triggers the detail of the energy control guide being displayed as the pop-up message, the energy control unit 200 may detect the selection, in Step S708, move to the automatic control of the facility or FMS (i.e., the automatic control menu of the facility or the facility control menu) to display the energy control guide on the integrated control monitor, in Step S709, and may perform a facility management and control according to the selection of the building manager, in Step S710.

For example, the building energy control method may continuously monitor BMS data such as a refrigerator state including a cold water flux ($m^2/h$), cold water inlet temperature (° C.), outlet temperature (° C.) and power consumption (kWh) to calculate a coefficient of performance (COP) and may continuously monitor the BMS data such as power consumption of the refrigerator. The BEMS may continuously monitor a variance of a refrigerator efficiency to determine and register a regular or irregular inspection time as an event in the FMS.

In another example, the building energy control method may use BMS data, such as an outdoor temperature, to set a detailed hot water temperature. When the outdoor temperature is high, a hot water temperature may be considered to be relatively warm, and when the outdoor temperature is low, a hot water temperature may be considered to be relatively cool. The BEMS may continuously monitor the outdoor temperature to perform the BMS control in consideration of the energy savings and comfort of building occupants.

In another example, when a menu item of an energy usage and consumption analysis is triggered, the building energy control method may determine whether a situation suitable for the BMS control or the FMS control, in view of an alarm related energy usage, exists to actively apply the situation in the building management for saving the energy as the event.

Provided is a building energy control system and method using an automatic display of an energy control guide to perform a building energy control management and a facility inspection.

In some embodiments, a building control system may include a user interface unit configured to display an energy control situation and a corresponding energy control guide during managing a building and facility and to receive a user input according to the energy control guide and an energy control unit configured to control energies of the building and facility through control of the building and facility according to the user input.

In one embodiment, the user interface unit may include a display unit including a situation display unit configured to display the energy control situation and a guide display unit configured to display the corresponding energy control guide during managing the building and facility and a input unit configured to receive the user input according to the energy control guide.

In one embodiment, the building energy control system may further include an integrated control item database configured to store an integrated control item by item selection data related to the building management or by a building feature and an integrated control unit configured to determine the integrated control item corresponding to the item selection data related to the building management or the building feature being received from a building manager based on the integrated control item database to display the determined integrated control item on the display unit.

In one embodiment, the integrated control item may include at least one of a floor facility, main area information, an energy usage, a work progress status, main control point information, an unidentified event status, a complaint report handling status and a control situation event.

In one embodiment, the building energy control system may further include an energy control situation database configured to store an energy control situation of the building and facility, a circumstance and management condition applicable to the energy control situation, a mapping between the energy control situation and the circumstance and management condition and a mapping between the circumstance and management condition and data measured by BMS (Building Management System) or BAS (Building Automation System).

In one embodiment, the building energy control system may further include an energy control guide database configured to store an energy control guide of the building and facility, a circumstance and a management condition applicable to the energy control guide, a mapping between the energy control guide and the circumstance and management condition and a mapping between the circumstance and management condition and measured data of BMS or BAS.

In one embodiment, the integrated control unit may use the data measured by the BMS or BAS to detect the circumstance and management condition and determine the energy control guide mapped with the detected circumstance and management condition from the energy control guide database to display the determined energy control guide on the display unit.

In one embodiment, the building energy control system may further include an energy control guide database configured to store the energy control situation of the building and facility as a guide form.

In one embodiment, the display unit may display the energy control guide being mapped with the user input, the energy control guide being displayed as a pop-up message and may display a corresponding energy control guide based on a search or sort operation in an energy control guide menu.

In one embodiment, the guide display unit may display a summary of the energy control guide on an integrated control monitor when an item in the energy control situation is triggered and may display a detail of the energy control guide as a pop-up message when the building manager triggers an event in the summary.

In one embodiment, the guide display unit may sort the energy control guide by the facility when a sort item of the energy control guide menu is triggered and may display contents searched by the building manager as a help message on the integrated control monitor when the energy control guide is searched by the building manager.

In one embodiment, the energy control unit may define a mapping between the energy control guide and a corresponding automatic control or FMS (Facility Management System) item.

In one embodiment, the building energy control system may further include a building management unit configured to manage the building and a facility management unit configured to manage the facility and the energy control unit may directly control the building management unit and the facility management unit to control energies of the building and facility.

In some embodiments, a building energy control method may include displaying an energy control situation on a display unit during managing a building and facility, displaying an energy control guide corresponding to the energy control situation on the display unit, inputting a user input according to the energy control guide and controlling energies of the building and facility through control the building and facility according to the user input.

In one embodiment, the building energy control method may further include storing an integrated control item by item selection data related to the building management or by a building feature and determining the integrated control item corresponding to the item selection data related to the building management or the building feature based on the integrated control item database to display the determined integrated control item on the display unit, the item selection data related to the building management or the building feature being received from the building manager.

In one embodiment, displaying the energy control situation may include defining an energy control situation of the building and facility, defining a circumstance and a management condition applicable to the energy control situation, mapping with the energy control situation and the circumstance and the management condition, mapping with the circumstance and the management condition and measured data of BMS (Building Management System) or BAS (Building Automation System), storing the energy control situation database through the definitions and the mappings, using the data measured by the BMS or BAS to detect the circumstance and management condition, determining the energy control situation mapped with the detected circumstance and management condition from the energy control situation database and displaying the determined energy control situation on an integrated control monitor.

In one embodiment, displaying the energy control guide may include defining the energy control guide of the building and facility, defining the circumstance and a management condition applicable to the energy control guide, mapping with the energy control guide and the circumstance and the management condition, mapping with the circumstance and the management condition and the data measured by BMS or BAS, storing the energy control guide database through the definitions and the mappings, using data measured by the BMS or BAS to detect the circumstance and management condition; determining the energy control guide mapped with the detected circumstance and management condition from the energy control guide database; and displaying the determined energy control guide on an integrated control monitor.

In one embodiment, displaying the energy control guide may include storing the energy control situation of the building and facility as a guide form, displaying the energy control guide corresponding to the energy control situation as a pop-up message when an item in the energy control situation is triggered, displaying a summary of the energy control guide on an integrated control monitor as a pop-up message when an item in the energy control situation is triggered, and displaying a detail of the energy control guide as a pop-up message when the building manager triggers an event in the summary.

In one embodiment, displaying the energy control guide may include mapping with the energy control guide and a corresponding energy control situation based on a search or sort operation in an energy control guide menu, sorting the energy control guide by the facility when a sort item of the energy control guide menu is triggered and displaying contents searched by the building manager as a help message on the integrated control monitor when the energy control guide is searched by the building manager.

In one embodiment, controlling energies of the building and facility may include determining a mapping with the energy control guide and an corresponding automatic control or FMS (Facility Management System) item, mapping with the energy control guide and the corresponding automatic control or the FMS (Facility Management System) item to display the energy control guide on the integrated control monitor and transferring to an automatic control menu of the facility or a facility control menu corresponding to the energy control guide when the building manager triggers an item of the energy control guide menu to perform an energy control.

Embodiments of the present disclosure defines the a building management plan saving energy by a corresponding situation, automatically displays an energy control management guide on an integrated control monitor when the corresponding situation occurs so that a modification and inspection of operation procedures is performed by a building manager and an energy control differential by an ability and experience of the building manager and a maintenance effect may be upwardly standardized.

Embodiments of the present disclosure may automatically perform a modification and adaptation through BMS and FMS according to a varied situation to contribute to reduction of a greenhouse gas.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A building energy control system comprising:
   a user interface unit configured to display an energy control situation and an energy control guide that corresponds to the energy control situation to manage a building and a facility, and to receive an input according to the energy control guide; and
   an energy control unit configured to control energy consumption in the building and the facility through control of the building and facility according to the input,
   wherein the user interface unit includes
   a display unit including a situation display unit configured to display the energy control situation and a guide display unit configured to display the corresponding energy control guide to manage the building and facility; and
   an input unit configured to receive the input according to the energy control guide,
   wherein the energy control guide includes a help message related to an energy control plan that includes a description of the energy control plan corresponding to the displayed energy control situation,
   wherein the guide display unit displays a summary of the energy control guide on an integrated control monitor when a selectable item for the energy control situation is selected and displays additional information for the energy control guide as a pop-up message when a selectable event in the summary is selected, wherein the additional information for the energy control guide displayed in the pop-up message does not include specific values corresponding to the energy control situation and energy control plan,
   wherein the energy control guide displayed on the guide display unit is sorted according to the facility when a sort item of the energy control guide menu is selected and contents searched by the building manager are displayed as the help message on the integrated control monitor when the energy control guide is searched by the building manager, and
   wherein, when an item of the energy control guide menu is selected to perform functions for controlling energy consumption, moving to an automatic control menu of the facility or a facility control menu corresponding to the energy control guide.

2. The building energy control system of claim 1, further comprising
   an integrated control item database configured to store a plurality of integrated control items according to item selection data related to the building management or according to a building feature; and
   an integrated control unit configured to determine the integrated control item corresponding to the item selection data related to the building management or the building feature based on the input to display the determined integrated control item on the display unit.

3. The building energy control system of claim 2, wherein the plurality of integrated control items include at least one of a floor facility, main area information, an energy usage, a work progress status, main control point information, an unidentified event status, a complaint report handling status or a control situation event.

4. The building energy control system of claim 2, further comprising
   an energy control situation database configured to store the energy control situation of the building and facility,
   a circumstance and management condition applicable to the energy control situation,
   a mapping between the energy control situation and the circumstance and management condition, and
   a mapping between the circumstance and management condition and data measured by a BMS (Building Management System) or a BAS (Building Automation System).

5. The building energy control system of claim 2, further comprising
   an energy control guide database configured to store the energy control guide of the building and facility,
   a circumstance and a management condition applicable to the energy control guide,
   a mapping between the energy control guide and the circumstance and management condition, and
   a mapping between the circumstance and management condition and data measured by a BMS (Building Management System) or a BAS (Building Automation System).

6. The building energy control system of claim 5, wherein the integrated control unit uses the data measured by the BMS or BAS to detect the circumstance and management condition, and determines the energy control guide mapped with the detected circumstance and management condition from the energy control guide database to display the determined energy control guide on the display unit.

7. The building energy control system of claim 2, further comprising an energy control guide database configured to store a plurality of energy control situations for the building and facility related to a corresponding energy control guide.

8. The building energy control system of claim 1, wherein the display unit displays the energy control guide based on the input at the input unit, the energy control guide being displayed as the pop-up message, and being selected for display based on a search or sort operation in an energy control guide menu.

9. The building energy control system of claim 1, wherein the energy control unit defines a mapping between the energy control guide and a corresponding automatic control or FMS (Facility Management System) item.

10. The building energy control system of claim 1, wherein the building energy control system further includes a building management unit configured to manage the building and a facility management unit configured to manage the facility, and
wherein the energy control unit directly controls the building management unit and the facility management unit to control energy consumption of the building and the facility.

11. A building energy control method comprising:
displaying an energy control situation on a display unit to manage a building and a facility;
displaying an energy control guide corresponding to the energy control situation on the display unit;
receiving an input according to the energy control guide; and
controlling energy consumption of the building and the facility through control of the building and the facility according to the received input,
wherein the display unit includes
a situation display unit configured to display the energy control situation and a guide display unit configured to display the corresponding energy control guide to manage the building and facility, and
an input unit configured to receive the input according to the energy control guide,
wherein the energy control guide includes a help message related to an energy control plan that includes a description of the energy control plan corresponding to the displayed energy control situation,
wherein displaying the energy control guide includes
storing the energy control situation of the building and facility as a user guide interface,
displaying the energy control guide corresponding to the energy control situation as a pop-up message when an item in the energy control situation is selected,
displaying a summary of the energy control guide on an integrated control monitor as a pop-up message when a selectable item in the energy control situation is selected,
displaying detailed information related to the energy control guide as a pop-up message when an event in the summary is selected, wherein the additional information for the energy control guide displayed in the pop-up message does not include specific values corresponding to the energy control situation and energy control plan,
mapping the energy control guide with a corresponding energy control situation based on a search or sort operation in an energy control guide menu,
sorting the energy control guide according to the facility when a sort item of the energy control guide menu is selected,
displaying contents searched as the help message on the integrated control monitor when the energy control guide is searched by a user, and
moving to an automatic control menu of the facility or a facility control menu corresponding to the energy control guide when an item of the energy control guide menu is selected to perform functions for controlling energy consumption.

12. The building energy control method of claim 11, further comprising
storing an integrated control item in an integrated control item database according to item selection data related to the building management or according to a building feature; and
determining the integrated control item corresponding to the item selection data related to the building management or the building feature based on the integrated control item database to display the determined integrated control item on the display unit, the item selection data related to the building management or the building feature being received through a user input interface.

13. The building energy control method of claim 11, wherein displaying the energy control situation includes
defining the energy control situation of the building and the facility;
defining a circumstance and a management condition applicable to the energy control situation;
mapping the energy control situation with the circumstance and management condition;
mapping the circumstance and management condition with data measured by a BMS (Building Management System) or a BAS (Building Automation System);
storing the energy control situation in a database using the defined and mapped information;
using the data measured by the BMS or BAS to detect the circumstance and management condition;
determining the energy control situation mapped with the detected circumstance and management condition from the energy control situation database; and
displaying the determined energy control situation on an integrated control monitor.

14. The building energy control method of claim 11, wherein displaying the energy control guide includes
defining the energy control guide of the building and the facility,
defining a circumstance and management condition applicable to the energy control guide,
mapping the energy control guide with the circumstance and management condition,
mapping the circumstance and management condition with the data measured by a BMS (Building Management System) or a BAS (Building Automation System),
storing the energy control guide in a database using the defined and mapped information,
using data measured by the BMS or BAS to detect the circumstance and management condition,
determining the energy control guide mapped with the detected circumstance and management condition based on the energy control guide database, and
displaying the determined energy control guide on an integrated control monitor.

15. The building energy control method of claim 11, wherein controlling energy consumption of the building and the facility includes determining the mapping between the energy control guide and the corresponding automatic control or FMS (Facility Management System) item, and mapping the energy control guide with the corresponding automatic control or the FMS (Facility Management System) item to display the energy control guide on the integrated control monitor.

\* \* \* \* \*